United States Patent
Leroux et al.

(10) Patent No.: US 8,640,860 B2
(45) Date of Patent: Feb. 4, 2014

(54) DEVICE FOR GRIPPING A BLOW-MOULDING CONTAINER PREFORM

(75) Inventors: Julien Leroux, Octeville-sur-Mer (FR); Franck Lacaille, Octeville-sur-Mer (FR); Pascal Bertin, Octeville-sur-Mer (FR); Willy Dujardin, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 13/637,893

(22) PCT Filed: Mar. 22, 2011

(86) PCT No.: PCT/FR2011/050600
§ 371 (c)(1),
(2), (4) Date: Sep. 27, 2012

(87) PCT Pub. No.: WO2011/121208
PCT Pub. Date: Oct. 6, 2011

(65) Prior Publication Data
US 2013/0015040 A1    Jan. 17, 2013

(30) Foreign Application Priority Data
Mar. 29, 2010   (FR) ...................................... 10 52302

(51) Int. Cl.
*B65G 47/34* (2006.01)
(52) U.S. Cl.
USPC .................... 198/803.12; 198/867.09; 294/93
(58) Field of Classification Search
USPC .................... 198/803.12, 867.09; 294/93, 195
See application file for complete search history.

(56) References Cited

U.S. PATENT DOCUMENTS

| | | | | |
|---|---|---|---|---|
| 5,328,181 A | * | 7/1994 | Mistrater et al. | 279/2.17 |
| 6,761,556 B1 | * | 7/2004 | Pellegatta et al. | 425/534 |
| 6,811,389 B1 | * | 11/2004 | Guiffant et al. | 425/526 |
| 7,008,215 B2 | * | 3/2006 | Goss | 425/534 |
| 7,284,778 B1 | * | 10/2007 | Pellegatta | 294/90 |
| 7,674,424 B2 | * | 3/2010 | Baumgarte et al. | 264/535 |
| 7,694,802 B2 | * | 4/2010 | Lapert | 198/470.1 |
| 8,287,270 B2 | * | 10/2012 | Lee et al. | 425/502 |
| 8,512,031 B2 | * | 8/2013 | Linke et al. | 425/534 |

FOREIGN PATENT DOCUMENTS

| | | |
|---|---|---|
| EP | 0357589 A2 | 3/1990 |
| FR | 2794109 A1 | 12/2000 |
| WO | 2009/018952 A2 | 12/2009 |

* cited by examiner

*Primary Examiner* — Douglas Hess
(74) *Attorney, Agent, or Firm* — Sughrue Mion, PLLC

(57) ABSTRACT

Device (1) for gripping an object such as a blow-molding container preform (3), comprising: a guiding body (12); a stop body (13), mounted so as to move axially relative to the guiding body (12) along an axis (4) of the device, intended to be aligned with the object (3) to be gripped; a mandrel support (7), equipped with a gripping mandrel (15), able to move axially relative to the guiding body (12) and having a plunge-in travel (8) going from a set-back position to a plunged-in position in which the mandrel (15) is capable of gripping the object (3). The stop body (13) has, together with the mandrel support (7), a system of support stops (18, 19) arranged so that the mandrel support (7) drives the stop body (13) axially onto a terminal portion of the plunge-in travel (8). The device (1) includes a return means (34, 36) mounted between the guiding body (13) and the stop body, for the purpose of driving the stop body along an axial set-back direction opposite direction of plunge-in travel.

20 Claims, 10 Drawing Sheets

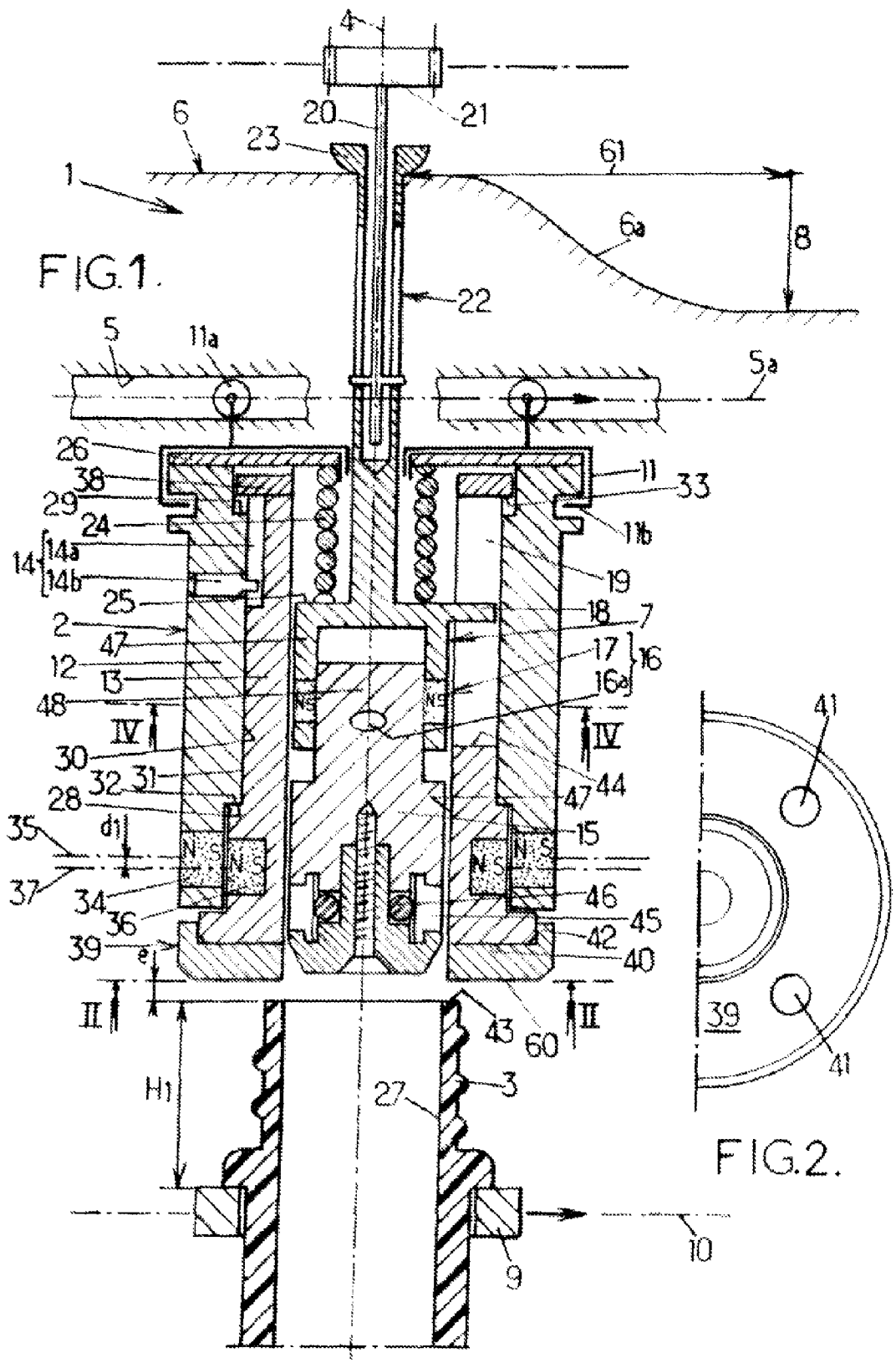

DEVICE FOR GRIPPING A BLOW-MOULDING CONTAINER PREFORM

CROSS REFERENCE TO RELATED APPLICATIONS

This application is a National Stage of International Application No. PCT/FR2011/050600, filed on Mar. 22, 2011, which claims priority from French Patent Application No. 1052302, filed on Mar. 29, 2010, the contents of all of which are incorporated herein by reference in their entirety.

OBJECT OF THE INVENTION

The invention relates to the field of devices for gripping objects, particularly preforms for the production of blow-moulded containers such as bottles.

The invention also relates to object conveyance systems which make use of such gripping devices, particularly for conveying thermoplastic preforms through a oven.

STATE OF THE PRIOR ART

Such preforms are generally obtained by injection. They have a tubular cylindrical body that is closed at one of its axial ends, the other end extending out in a neck which is also tubular. The neck is generally injected so that it already has its final shape, while the body of the preform undergoes relatively significant reshaping to form the final container after the blowing operation. The neck of the preform often has a supporting collar which cooperates with a clamp or guide rail. The thinned edge at the axial open end of the neck is called the "mouth" of the container. The axial distance between the mouth end and the bottom of the collar is generally a very specific distance required by the container cap.

The blow-moulding operation that shapes the body of the preform must bring the body to a temperature greater than the glass transition temperature of the material. The preform is thermally prepared by being circulated inside an oven. The oven uses infrared lamps, for example, to heat the preform as it is advanced by a conveyance system.

Gripping devices intended for conveyance systems that pass through an oven are generally not simple clamps because the gripping device must allow advancing the object rotationally around an axis. In particular, the axis of the preform must be aligned with the axis of the gripping device during conveyance of the preform within the oven, as a disparity during heating could result in preform deformations.

Patent application WO 2009/018952 describes a preform gripping device for blow-moulding machines. The device comprises a mandrel which is inserted into the neck. The mandrel has radially elastic jaws that hold the preform by friction. The mandrel described additionally has a shoulder that is in a fixed position relative to the mandrel head. The shoulder provides support contact for the mouth of the preform neck. This shoulder acts to seat the preform to ensure that the mouth of the gripped preform and the axis of the mandrel are properly perpendicular. However, such a device has a complex sequence for releasing the held object because of the friction of the mandrel against the neck. A mechanical part called a stripper must hold the preform at the end of its conveyance while the mandrel is axially withdrawn from the neck. As the shoulder of the device is pressing against the mouth of the preform, the stripper must either press against the outer contours of the neck, which are less precise than the mouth, or the stripper and the shoulder serving to seat the preform share the radial surface at the end of the mouth.

Also, preforms that are to travel through an oven are brought to a loading position for the conveyance system through the oven by guide rails, wheels having the traditional clamps, or by notched wheels. The pressure of the preform collar against the supporting surface of the rail or the holding surface of the preform clamp is generally only due to the weight of the preform. The very high production rates of blow-moulding machines cause the preforms to oscillate continuously around their position of equilibrium. It is therefore necessary for the gripping means in the retracted state to be at least two millimeters above the mouth of the preform neck, to allow the preform to reach the position where it is to be grasped without the small oscillations of the preform causing it to knock against the gripping means.

It is also necessary to stabilize the preform while the mandrel is introduced into the preform neck.

Patent application FR 2794109 describes a preform conveyance system for blow-moulding thermoplastic containers. The gripping system comprises a stabilizer tube which the radially elastic jaws of the mandrel rub against before entering the neck of the preform. The stabilizer tube is thus carried along as the mandrel descends and presses the preform against the support for the preform collar. This movable stabilizer tube improves the alignment of the preform axis and the mandrel axis.

When the mandrel is retracted from the preform neck, the stabilizer tube is also lifted by the friction of the mandrel in the stabilizer tube. This holds the tube in position above the mouth while awaiting the arrival of a new preform. The tube can also serve as a stripper, holding the neck of the preform in place as the mandrel is retracted.

However, one disadvantage of the device described in FR 2794109 is that the repeated friction of the mandrel every one or two seconds in the same stabilizer tube may require lubrication to prevent the production of metal filings. Improving the safety of container manufacturing requires reducing the risk of abrasion or contamination around the container.

TECHNICAL PROBLEM SOLVED BY THE INVENTION

The invention proposes a device for gripping objects such as a blow-moulding container preform, as well as a system for conveying objects, which overcome the above disadvantages or satisfy the above needs.

One aim of the invention is to control the alignment of the object with the axis of the gripping device, and to allow the arrival of a new preform, while improving the safety of the gripping operation.

GENERAL DESCRIPTION OF THE INVENTION

In one embodiment, the device for gripping an object such as a blow-moulding preform comprises:
  a guiding body;
  a stop body, mounted so as to move axially relative to the guiding body along an axis of the device;
  a mandrel support, equipped with a gripping mandrel, able to move axially relative to the guiding body and having an insertion stroke from a retracted position to an insertion position in which the mandrel is capable of gripping the object.

The stop body has, together with the mandrel support, a system of support stops arranged so that the mandrel support drives the stop body axially over an end portion of the insertion stroke.

The device comprises a return means mounted between the guiding body and the stop body, for the purpose of driving the stop body in an axial retraction direction that is opposite the direction of the insertion stroke.

One can see that, for the end portion of the insertion stroke, the return means holds the stop body firmly against the system of support stops. The stop body and the mandrel are therefore solidly attached during the end portion of the insertion stroke, regardless of whether the mandrel support is moving towards the insertion position or is returning from it. Additionally, the stop body is mounted to move in translation along the axis of the device, and may serve as a mechanical reference for aligning the object to be grasped along the axis of the device. In addition, the return means forces the stop body to retract. This allows new preforms to arrive in a "ready to be grasped" position, without risk of becoming stuck. The movement of the stop body occurs without friction with the mandrel. This improves the safety of the operation.

Advantageously, the stop body and the guiding body comprise a system of guiding stops that limit the axial movement of the stop body in the retraction direction. This allows the stop body to act as a stripper. With the system of guiding stops, the stop body can hold the preform in place during retraction of the gripping mandrel.

In a first particular embodiment, the stop body and the guiding body are of non-magnetic material. The return means comprises at least one permanent magnet mounted onto one of either the guiding body or stop body and an element of magnetic material mounted on the other of the guiding body or stop body. The magnetic element and the permanent magnet are arranged so that they apply an axial mechanical force to the stop body pressing on the guiding body, said mechanical force being oriented in the stop body retraction direction.

Advantageously, the return means comprises at least one pair of return magnets consisting of a first permanent return magnet mounted on the guiding body and a second permanent return magnet mounted on the stop body. The magnetic axes of the first and second permanent return magnets are perpendicular to the axis of the device and are located in the same radial half-plane. The magnetic axis of the first permanent return magnet is offset along the axis of the device relative to the magnetic axis of the second magnet, in the insertion direction if the two permanent return magnets are mutually attracting and in the retraction direction if the two permanent return magnets are mutually repelling. When the two return magnets are attracted to each other, the attraction has the effect of reducing the axial offset. When the two magnets repel each other, the magnetic repulsion has the effect of increasing the axial offset. In either case, the effect of the pair of return magnets is to propel the stop body in the axial direction of retraction.

The device advantageously comprises a plurality of pairs of return magnets, the first return magnets of each pair being identical and the second return magnets of each pair being identical, the half-planes being uniformly distributed around the axis of the device, and the axial offset distances for each pair being identical. The symmetry of the distribution of the pairs of return magnets around the axis allows the radial forces applied by each pair of return magnets to compensate for each other. Only the axial component of the forces applied by the pairs of return magnets is added on, generating a retraction force on the stop body.

In a first variant, the stop body has a radially extending seating surface located at the insertion end of the stop body. The device additionally comprises a removable adapter washer intended to be attached to said seating surface. This allows the gripping device to adapt to different objects, particularly preforms having a different height between the mouth and the collar underside.

Advantageously, the device comprises a plurality of attachment magnets for attaching the adapter washer to the stop body. This reduces the time required to convert the gripping device. This is particularly useful for blow-moulding facilities where the production rate may reach 34 containers per second, while the time required to heat a preform above its glass transition temperature is a few dozen seconds. In this type of facility, the number of preform gripping devices to be conveyed through the oven amounts to several hundred. One can see that reducing the time to convert each of the gripping devices reduces the cost of changing the container series.

Advantageously, the attachment magnets of the stop body are arranged around the axis of the device so as to come in between the second return magnets. Thus the magnetic field created in the stop body by the attachment magnets attaching the adapter washer creates little interference with the return magnets.

In a second variant, the device comprises a selective means of axial indexing between the mandrel support and the gripping mandrel. Said selective means defines several extreme positions of the gripping mandrel for the same insertion position of the mandrel support.

It is particularly advantageous to combine this second variant with the above first variant. The distance between the different extreme positions of the gripping mandrel can correspond to the thickness of the adapter washer. Thus the gripping mandrel is inserted into the neck to the same distance from the mouth, even if the preform series to be held is changed.

Advantageously, the selective axial indexing means comprises a groove having two parallel walls which a pin slides between. At least a portion of the groove is helicoid. The groove is arranged in the mandrel support and the pin is attached to the mandrel. Alternatively, the groove is arranged in the mandrel and the pin is attached to the mandrel support. By causing the gripping mandrel to pivot around the axis of the device while the mandrel support remains fixed, the axial position of the mandrel relative to the mandrel support can be varied.

Advantageously, the groove is closed at its two ends. The device additionally comprises at least one pair of indexing magnets mounted so they are repelling, one on the mandrel support and the other on the gripping mandrel, such that the pin is pressed against one of the two ends of the groove. The closed ends of the groove act as angular stops. The angularly indexing magnets together with the angular stops form an angularly bistable assembly that the helicoid groove converts into an axially bistable device.

In a third variant, the stop body comprises an external angular indexing means with the guiding body and an internal angular indexing means with the mandrel support. The guiding body is assembled to rotate freely in the main body of the device. The main body of the device may, for example, be made to move translationally along a conveyance path which passes through an oven for example. The mandrel support may be made to rotate. This allows pivoting the held object (the preform) around the axis of the gripping device while it passes through the oven.

Advantageously, the indexing magnet or magnets mounted on the mandrel support are each facing one of the first return magnets when the mandrel support is in the insertion position and have the same magnetic orientation as said first return magnet. Thus the indexing magnets contribute to reinforcing the return force generated by the return magnets.

In a second particular embodiment, the device comprises a selective angular indexing means between the stop body and the mandrel support, having a plurality of angular positions in each of which the axial movement is limited by a system of support stops which allow driving the stop body axially over a different portion of the insertion stroke of the mandrel support, different for each of the angular positions. This second embodiment allows varying the end of the stop body that acts as seating while keeping the same insertion stroke for the mandrel support. This allows the gripping device to adapt to different neck heights with no need to add an additional part. This is an alternative solution to adding an adapter washer, reducing the number of part references to be kept in stock.

Advantageously, the device comprises a selective angular indexing means between the guiding body and the stop body, having a plurality of angular positions in each of which the axial movement of the stop body relative to the guiding body is limited by a system of axial guiding stops defining a retracted position of the stop body that is different for each of said angular positions. This allows having several retraction distances for the stop body acting as a stripper, for the same retraction position of the mandrel support. Thus the retracted position of the stop body acting as a stripper can be adjusted to the same distance above the mouth for different neck heights.

In another aspect, the invention also relates to a system for conveying objects, comprising a conveyor that conveys a plurality of the above gripping devices. The system has a loading area and a means of bringing objects to be loaded on a loading seat. The axis of a gripping device is perpendicular to the path said gripping device follows as it passes through the loading area. Said gripping device cooperates with a fixed cam system to drive the mandrel support axially.

BRIEF DESCRIPTION OF FIGURES

The invention will be better understood by examining a detailed description of a few embodiments provided as non-limiting examples, illustrated by the attached drawings in which:

FIG. 1 is a longitudinal cross-section of a first embodiment of a gripping device in a retracted position, equipped for a short neck, FIG. 2 is a partial view along plane II-II of FIG. 1.

DETAILED DESCRIPTION OF THE INVENTION

Figure 3:
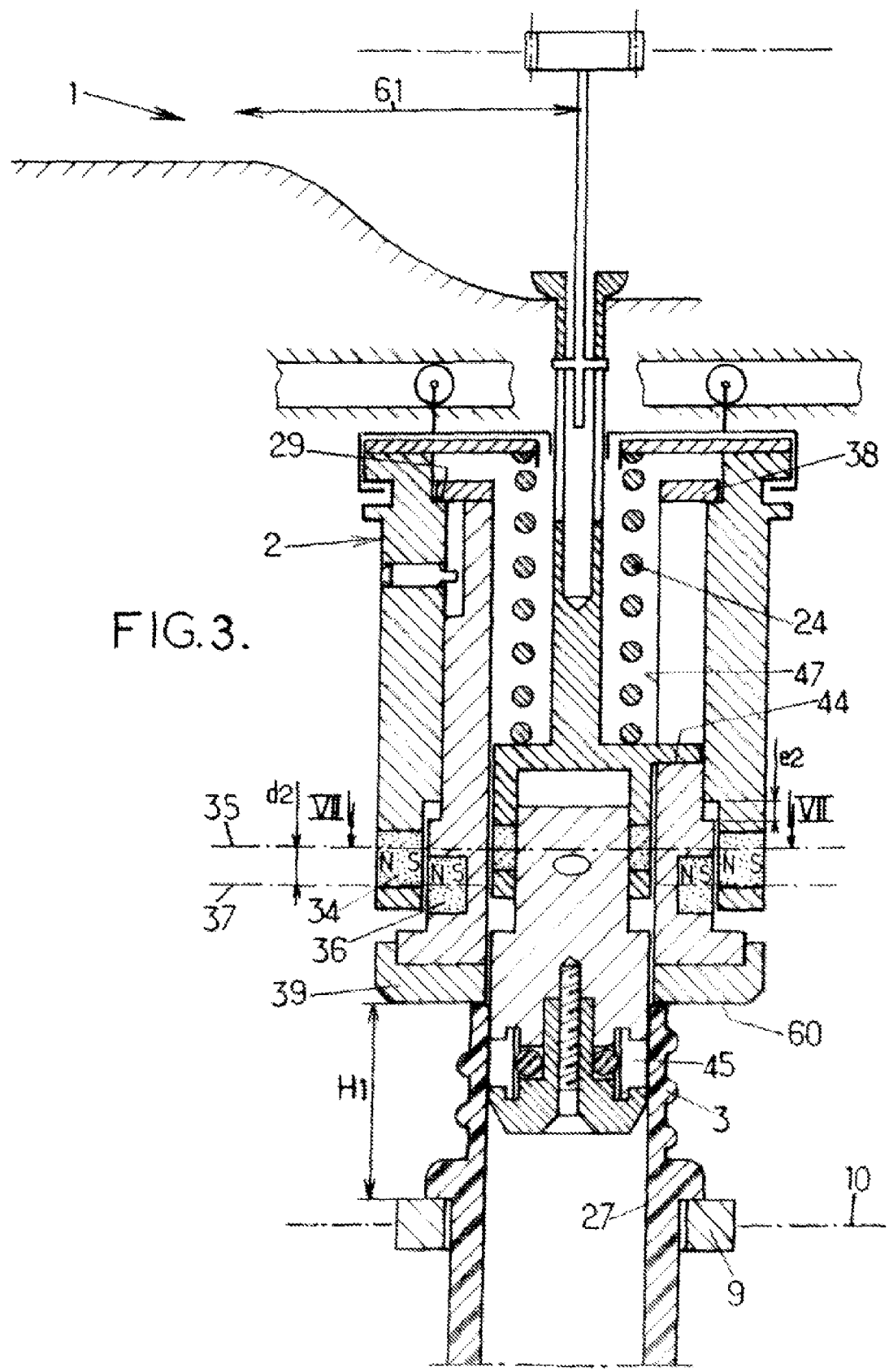
FIG. 3 is a longitudinal cross-section of the first embodiment in the insertion position, for a short neck.

A conveyance system 1, illustrated in FIG. 1, comprises a device 2 for gripping a preform 3. The conveyance system 1 also comprises a conveyor rail 5 extending along a conveyance path 5a. A loading area 61 of the conveyance system 1 extends from a loading start position illustrated in FIG. 1 to a loading end position illustrated in FIG. 3. The conveyance path 5a is horizontal in the loading area 61. The gripping device 2 has a gripping device axis 4 which is perpendicular to the conveyance path 5a.

The conveyance system 1 also comprises a fixed cam system 6 which causes a displacement 6a allowing the mandrel support 7 to rise or descend. The high position of the fixed cam system 6 illustrated in FIG. 1, and the low position illustrated in FIG. 3, define the insertion stroke 8. The insertion direction is from top to bottom.

The conveyance system 1 also comprises a loading seat 9 for the preform 3, moved by conveyor means (not represented) along a preform 3 conveyor path 10. The path 10 runs parallel to the conveyor rails 5, inside the loading area 61. The horizontal speed of the loading seat 9 is identical to the speed at which the gripping device 2 is conveyed along the conveyor rails 5. This allows the axis 4 of the gripping device 2 to remain aligned with the axis of the preform 3 throughout the entire loading area 61.

The gripping device 2 comprises a main body 11 equipped with rollers 11a adapted to the conveyor rails 5 in order to guide the main body 11 in its translational movement.

The gripping device 2 also comprises a guiding body 12 and a stop body 13, both substantially tubular and coaxial to the axis 4 of the device 2. The guiding body 12 is mounted to allow rotation within the main body 11 while being prevented from translational movement in the axial direction by a rotating stop 11b. In other words, the axial position of the main body 11 upwards and downwards at any given moment is determined by the conveyor rail 5.

The stop body 13 is mounted to allow axial movement inside the guiding body 12 while being attached to the guiding body 12 so that they rotate together, by an external angular indexing means 14. The external indexing means 14 may comprise, as illustrated in FIG. 1, a groove 14a running longitudinally in the stop body 13 and a pin 14b that fits into the groove 14a and is attached to the guiding body 12.

Figure 4:
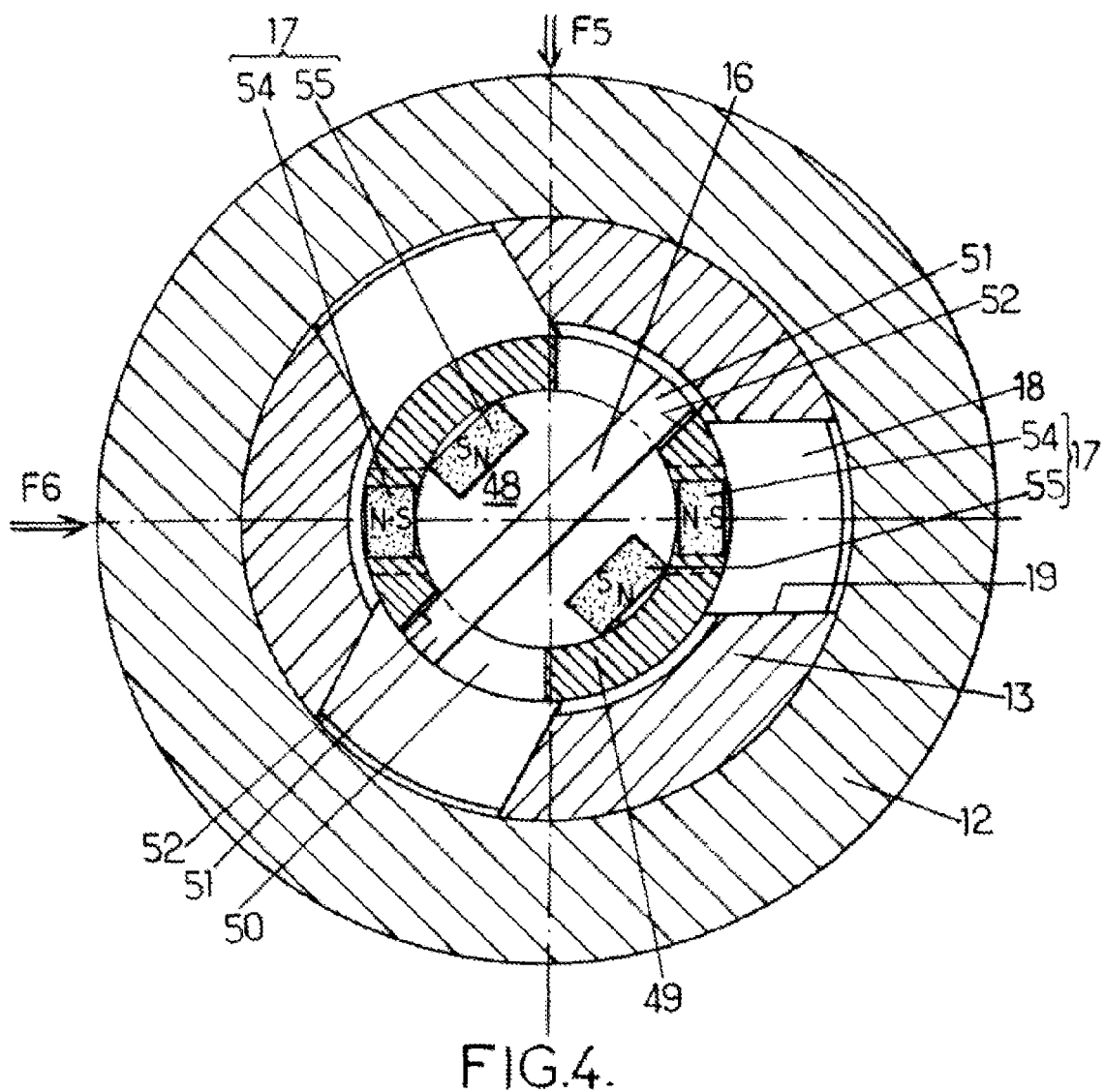
FIG. 4 is a transverse cross-section along plane IV-IV of FIG. 1.
Figures 5, 6:
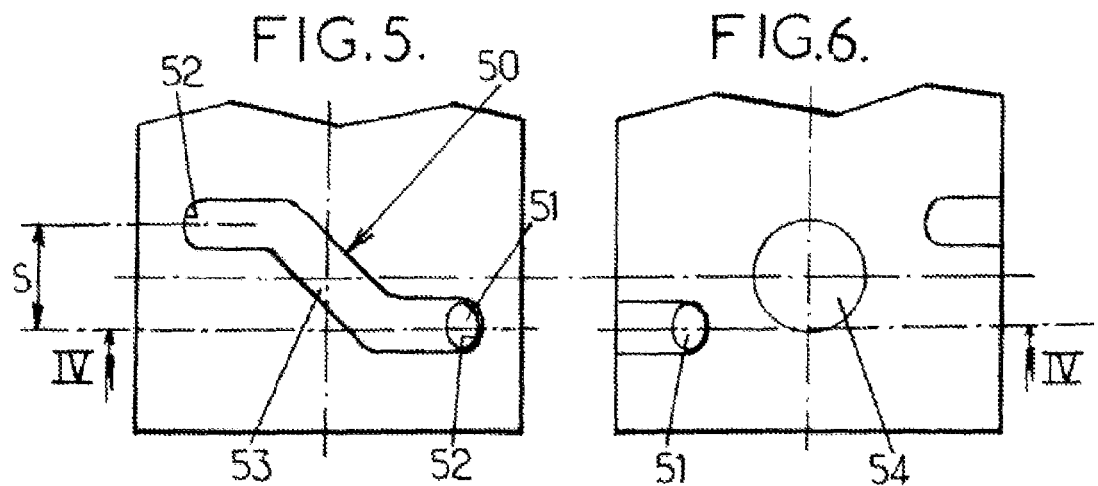
FIG. 5 is a partial view of the mandrel support and the mandrel along arrow F5 in FIG. 4.
FIG. 6 is a partial view of the mandrel support and the mandrel along arrow F6 in FIG. 4.

The mandrel support 7 is solidly attached, translationally and rotationally, to a gripping mandrel 15 by an indexing selection means 16 comprising a dowel 16a and a pair 17 of indexing magnets which operate as detailed below for FIGS. 4 to 6.

The mandrel support 7 comprises three angular indexing tongues 18 sliding vertically along three longitudinal grooves 19 in the stop body 13. The longitudinal grooves 19 form an internal angular indexing means 19 of the stop body 13 with the mandrel support 7.

A drive shaft 20 is attached to a notched wheel 21 cooperating with a chain, not represented. The mandrel support 7 comprises an axially telescoping means 22 which ensures angular indexing between the mandrel support 7 and the drive shaft 20. The angular indexing telescoping means 22 may comprise a radial dowel sliding in longitudinal grooves.

It is understood that the external indexing means 14, the internal indexing means 19, the selective indexing means 16, and the means 22 act such that the assembly formed by the guiding body 12, the stop body 13, the mandrel support 7, the gripping mandrel 15, and the notched wheel 21, form an assembly which rotates as one unit. The notched wheel 21 and the guiding body 12 move parallel to each other along the conveyor rail 5.

Next will be described an axial stop system and a return means which allow determining the axial position of the mandrel support 7, the gripping mandrel 15, and the stop body 13.

The cam system 6, which is fixed relative to the conveyance system 1, comprises a surface which a roller 23 of the mandrel support rests against. A supporting spring 24, which is a coil spring, is arranged axially between a shoulder 25 of the mandrel support 7, facing towards the top of the device, and a cover 26 attached to the stop body 13. The supporting spring 24 is assembled in its compressed state and applies a vertical downwards force to the roller 23, using the conveyor rail 5 as support.

The guiding body 12 has a lower counterbore 28 forming a radial surface facing towards the bottom of the guiding body 12, and an upper counterbore 29 forming a radial surface facing towards the top of the guiding body 12. The guiding body 12 also has a guide bore 30 extending axially between the two lower 28 and upper 29 counterbores. The stop body 13 has an outer diameter 31 adjusted to the guide bore 30, guaranteeing good coaxiality between the guiding body 12 and stop body 13. The stop body 13 comprises a shoulder 32 that cooperates with the lower counterbore 28. A washer 38 extends radially beyond the diameter 31 and thus provides a shoulder 33 that cooperates with the upper counterbore 29.

The guiding body 12 also comprises four first permanent magnets 34 having a radial magnetic axis distributed every 90 degrees within a first horizontal plane 35. The stop body 13 comprises four second permanent magnets 36 each having a radial magnetic axis parallel to the magnetic axis of one of the four first magnets 34 and thus forming four pairs 34-36 of return magnets. The magnetic axes of the first and second return magnets of each pair are located in the same radial half-plane. The magnetic axes of the four second return magnets 36 are all located in a second horizontal plane 37 that is offset downwards by an axial distance "d1".

The gripping mandrel 15 is attached inside the mandrel support 7 such that the lower end of the gripping mandrel 15 is slightly retracted relative to the lower end of the adapter washer 39. Thus, when the mandrel support 7 is in a retracted position, as illustrated in FIG. 1, the lower end of the adapter washer 39 is horizontal and located at a distance "e1" above the mouth 43 of the preform 3.

The gripping mandrel 15 comprises a ring 45 received in an annular groove and pressed radially outwards by an O-ring 46. The stop body 13 has an inner diameter 47 that is greater than the extreme radial dimensions of the three-section ring 45 so that there is no friction between the gripping mandrel and the stop body 13 when the mandrel support is in the retracted position.

As illustrated in FIGS. 1 and 2, the gripping device 2 also comprises an adapter washer 39 pressing against a radially extending seating surface 40 of the stop body 13, and located at the insertion end of the stop body 13. The adapter washer 39 is attached to the stop body 13 by four pairs of attachment magnets 41, one of the attachment magnets of each pair being attached (embedded or glued) to the stop body 13 and level with the seating surface 40, and the other attachment magnet 41 of each of the four pairs being attached to the adapter washer 39. Each of the attachment magnets 41 is a permanent magnet having a vertical magnetic axis, the magnets of each pair being arranged so as to be attracted to each other.

Advantageously, the four pairs of attachment magnets 41 are angularly arranged so they alternate with the four pairs 34-36 of permanent return magnets, as illustrated in FIG. 2.

One can see that it is particularly fast to install the adapter washer 39 on the end of each of the gripping devices of the conveyance system 1. Removal of the adapter washer 39 is also simple, because of a lip 42 on the adapter washer 39 extending axially around the stop body 13. The operator takes hold of the lip 42 and pivots the adapter washer 39 around the axis 4 of the device until the two magnets 41 of each pair of attachment magnets are moved apart from each other.

As illustrated in FIG. 3, when the gripping device 2 reaches the end of the loading area, the roller 23 integrally attached to the mandrel support 7 is at the bottom of the displacement distance 6a defined by the fixed cam system. The supporting spring 24 presses axially against the conveyor rail 5 via the bearing rollers 11a, the main body 11, the rotating stop 11b, the guiding body 12, and the cover 26 for the guiding body 12.

The insertion stroke 8 of the mandrel support 7 comprises a first portion in which the indexing tongue 18 slides along the longitudinal groove 19 to the bottom 44 of the longitudinal grooves 19. The insertion stroke 8 then continues in the insertion direction in a terminal portion of the insertion stroke 8 during which the indexing tongues 18 of the mandrel support 7 move the stop body 13 along, until the supporting washer 38 of the stop body 13 comes into contact with the upper counterbore 29 of the guiding body 12.

The axial distance between the shoulders 32 and 33 is greater than the axial distance between the counterbores 28 and 29 by a value equal to a distance "e2". "e2" corresponds to the axial play between the stop body 13 and the guiding body 12. "e2" also corresponds to the terminal portion of the insertion stroke 8. During the terminal portion e2 of the insertion stroke 8, the second horizontal plane 37 of the two repelling magnets moves away to a distance "d2" from the first horizontal plane of the magnetic axes of the first repelling magnets 34 attached to the repelling body 12. The sizes of the magnets 34, 36 are chosen so that the repelling force is at its maximum between d1 and d2.

The terminal portion e2 of the insertion stroke 8 occurs without significant friction because the first and second magnets 34, 36 are magnetically oriented to be attracting; they are maintained at a radial distance from each other by the adjustment of the diameter 31 in the bore 30. This adjustment can be lubricated with no risk of contaminating the containers.

The preform 3 has an inside diameter 27 less than the extreme radial dimensions of the three-section ring 45, so that introducing the gripping mandrel 15 inside the diameter 27 of the preform 3 causes compression of the O-ring 46.

When the mandrel support 7 has reached the fully inserted position, the lower surface 60 of the adapter washer 39 comes into contact with the mouth 43 of the preform 3. Thus the conveyance system 1 can continue along the conveyance path while the loading seat 9 withdraws from below the collar of the preform 3. The preform 3 is firmly held in alignment with the axis 4 of the gripping device 2 by the friction of the three-section ring 45 against the preform, and by the fact that the stop body 13 and the adapter washer 39 are pressed tightly in the retraction direction against the tongue 18 of the mandrel support 7 by the four pairs of return magnets 34-36. Thus, in spite of the vibrations caused by high production speeds, the lower surface 60 of the adapter washer 29 behaves as a fixed seating relative to the gripping mandrel 15. The distance "e1" that the gripping device 2 retreats above the mouth 43 of the preform 3 is equal to the axial play "e2" between the stop body 13 and the guiding body 12.

The selective axial indexing means 16 between the mandrel support 7 and the gripping mandrel 15 will now be described, with reference to FIGS. 4 to 6.

The gripping mandrel 15 comprises a shaft 48 received in a skirt 49 of the mandrel support 7. The transverse dowel 16a fits tightly in the shaft 48 and enters two diametrically opposite grooves 50 arranged in the skirt 49 of the mandrel support 7. The ends of the dowel 16a form two pins 51 sliding in an adjusted manner between the two parallel walls of each of the grooves 50. Each of the grooves 50 comprises two closed ends 52 axially distanced by a distance S and connected by a helicoid portion 53. Thus when the gripping mandrel 15 pivots around the axis 4 of the device inside the mandrel support 7, the axial position of the gripping mandrel 15 is offset by the distance S relative to the mandrel support 7.

Two first permanent indexing magnets 54 are mounted in the skirt 49 of the mandrel support 7, and two second permanent indexing magnets 55 are mounted in the shaft 48 of the mandrel 15 so that they face the first magnets 54 when the pin 51 is in the middle between the two ends 52 and in the middle of S, in the helicoid portion 53 of the grooves 50. The first and second indexing magnets have radially oriented magnetic axes that are inversely magnetic to each other such that they repel each other. The second indexing magnets 55 therefore tend to move away from the first indexing magnets 54 until the pins 51 come into contact with one of the two ends 52 of the grooves 50. In other words, the pairs of indexing magnets 54-55 behave as an angularly bistable mechanism. The helicoid portion 53 converts this angularly bistable mechanism into an axially bistable mechanism. Such a mechanism allows very quickly changing the preform 3 series to be handled. The operator simply pivots each of the gripping mandrels 51 of each of the gripping devices 2 of the conveyance system 1 so that the gripping mandrel 15 assumes a different extreme position of the mandrel for the same insertion position of the mandrel support 7.

Figure 7:
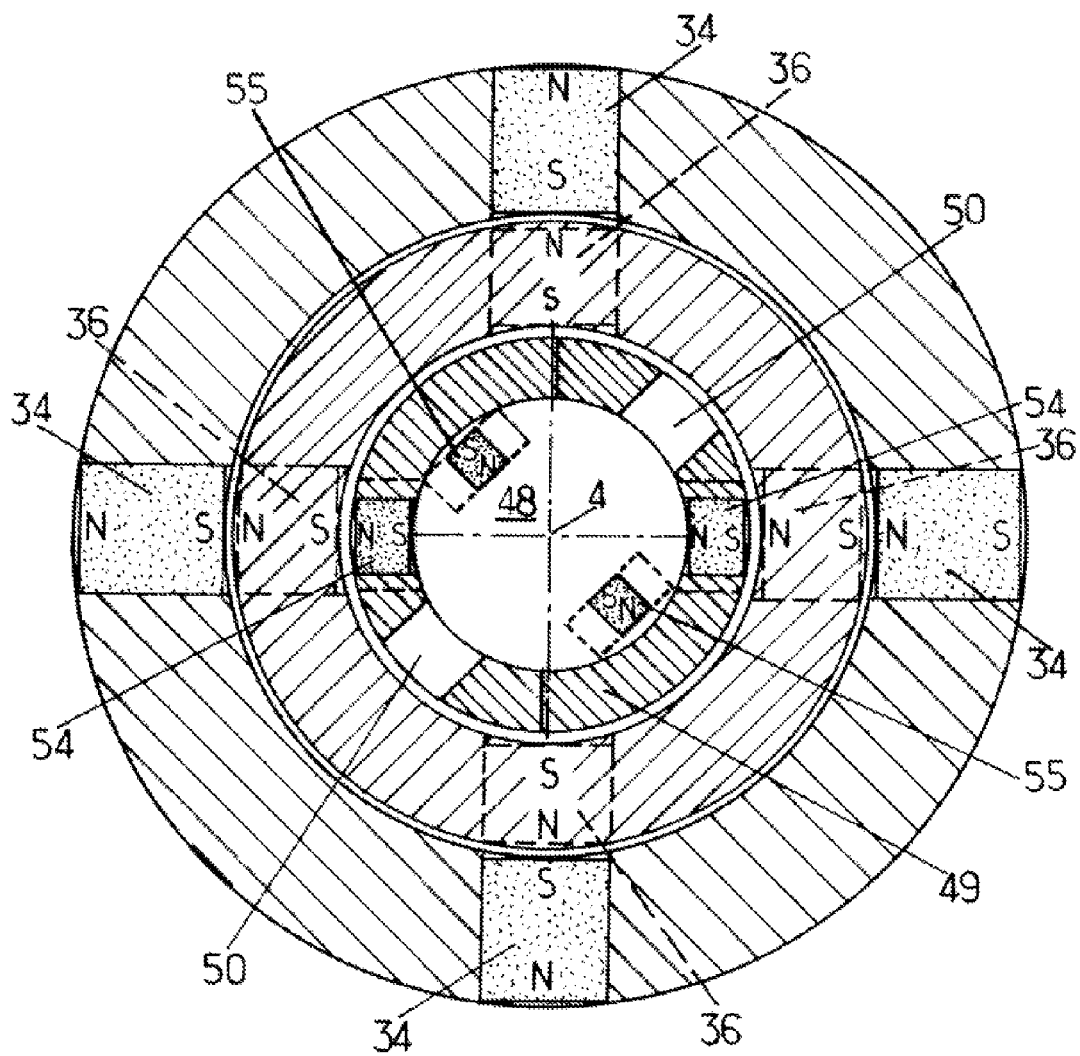
FIG. 7 is a transverse cross-sectional view along plane VII-VII of FIG. 3.

As illustrated in FIG. 7, the first indexing magnets 54 of the mandrel support 7 are axially positioned so that they substantially face the first return magnets 34 of the guiding body 12. In addition, the six permanent magnets constituting the first two indexing magnets 54 and the pairs 34-36 of return magnets positioned facing the first two magnets 54 are all oriented in the same magnetic direction. Thus the magnetic effects of the above six magnets mutually reinforce each other. In other words, the three magnets consisting of one of the first indexing magnets 54 and the two magnets of the pair of return magnets 34-36 positioned facing said first indexing magnet 54, are in a north-south orientation in the centripetal direction on the left in FIG. 7, while the three other diametrically opposite magnets are in a north-south orientation in the centrifugal direction. This arrangement reinforces the return force when the mandrel support 7 is in the inserted position, as well as reinforcing the remaining of the gripping mandrel 15 in the selected axial indexing.

The two other pairs of repelling magnets that do not correspond to any first indexing magnets are both in a north-south orientation in the centripetal direction. Thus the magnetic fields created by the two pairs illustrated at the top and bottom of FIG. 7 have an impact on the second indexing magnets 55, compensating for each other.

Figure 8:
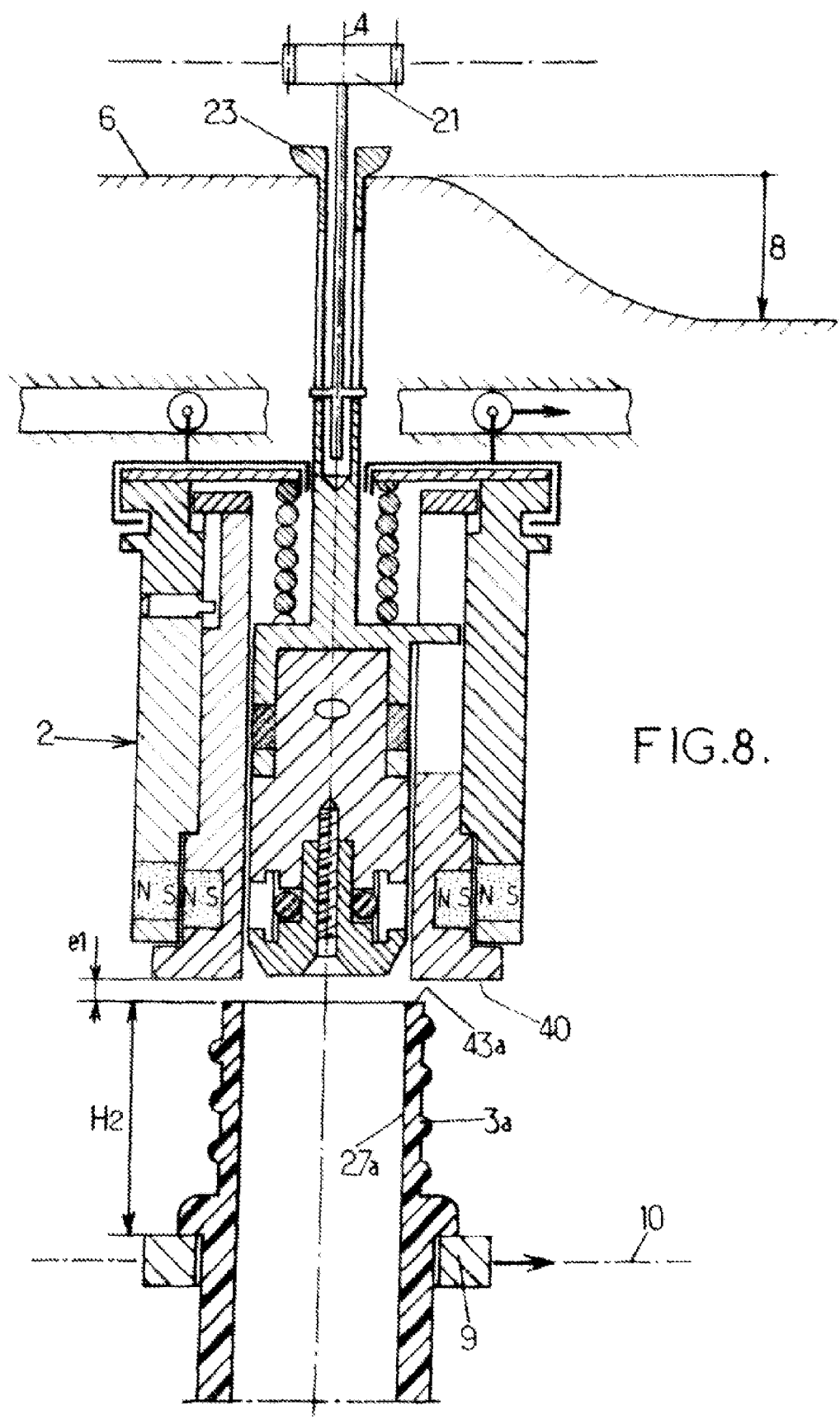
FIG. 8 is a longitudinal cross-section of the first embodiment in the retracted position, for a long neck.
Figure 9:
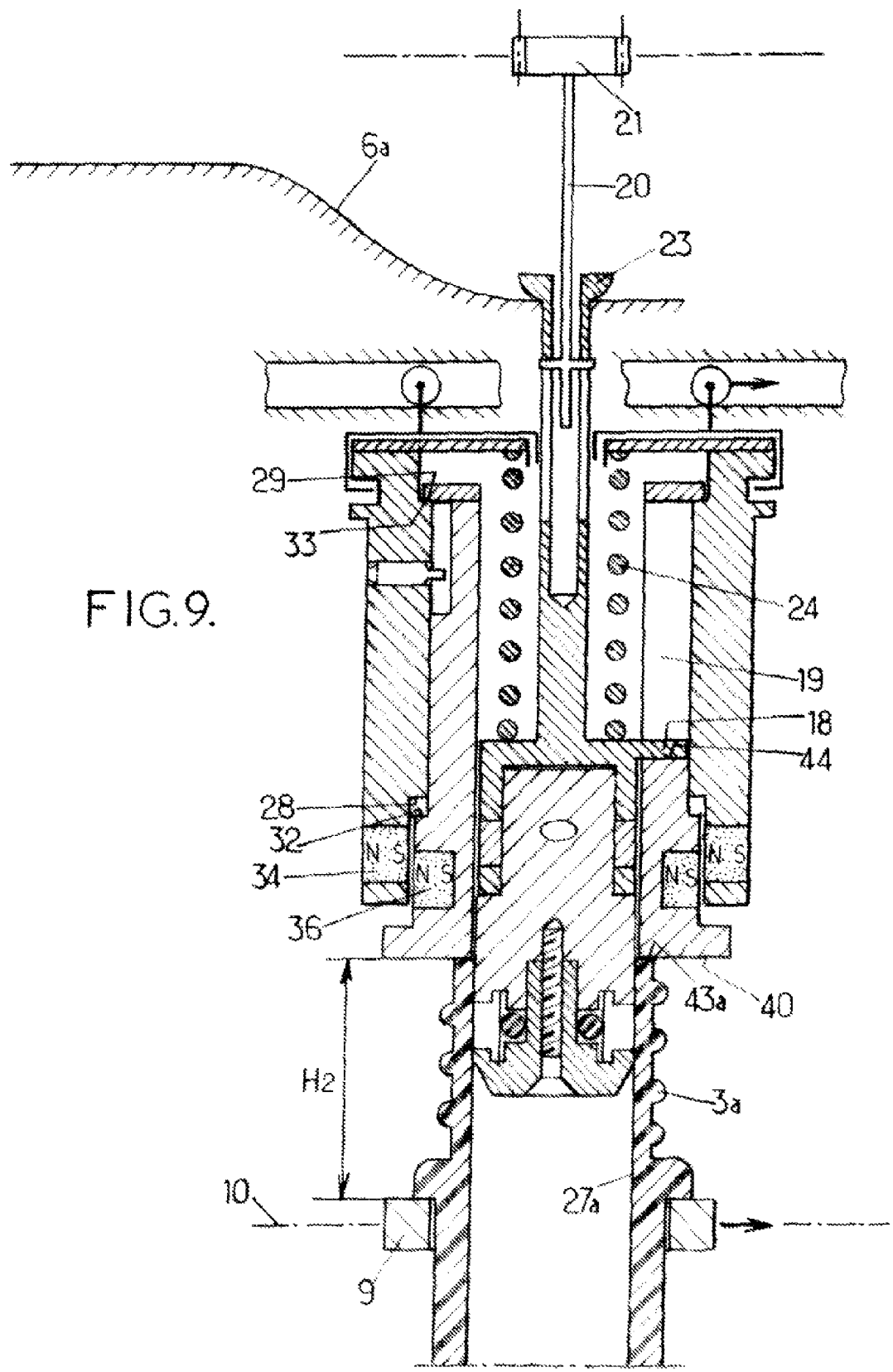
FIG. 9 is a longitudinal cross-section of the first embodiment in the insertion position, for a long neck.

The advantages of the adapter washer 39 and the selective axial indexing means 16 will now be illustrated with reference to FIGS. 8 and 9. The same conveyance system 1 as the one described for the above figures allows a rapid change of series to adapt to preforms 3a having a reference height H2 between the mouth 43 and the loading seat 9 that is different from preform 3. The axial thickness of the indexing washer 39 corresponds to the height difference "H2−H1". In addition, the distance S caused by the change in axial indexing of the gripping mandrel 15 is also equal to the difference "H2−H1". The seating surface 40 is then situated at a distance "e1" above the mouth 43 of the preform 3. Therefore, regardless of whether it is preform 3 or 3a, the gripping device 2 presses against the mouth 43 or 43a when in the inserted position, and rises by the same distance e1=e2 above said mouth in the retracted position.

The seating surface 40 at the end of the stop body 13 behaves as a fixed seat relative to the gripping mandrel 15, even when the loading seat 9 has been removed.

When the mandrel support 7 descends into the inserted position, the three-section ring 45 penetrates to the same depth inside the inner diameter 27a of the preform 3a as in the short neck configuration illustrated in FIGS. 1 to 7.

A second embodiment of the invention will now be illustrated with reference to FIGS. 10 to 13. The advantage of this embodiment is that when changing the series from preforms 3 having a neck height H1 to preforms 3a having a neck height H2, no inventory of additional adapting parts is required.

The conveyance system 101 differs from the conveyance system 1 described above in the selective axial indexing means 116 between the mandrel support 107 and the gripping mandrel 115. It also differs in the fact that the external angular indexing means 114 between the stop body 113 and the guiding body 112 is a selective means having two relative angular positions that are selectable, and in the fact that the angular indexing means 119 between the stop body 113 and the mandrel support 107 is a selective means also having two relative angular positions that are selectable. In addition, each of the gripping devices 102 has a repelling means 134 assembled between the guiding body 112 and the stop body 113 which is in the form of an elastic coil spring 134.

Figure 10:
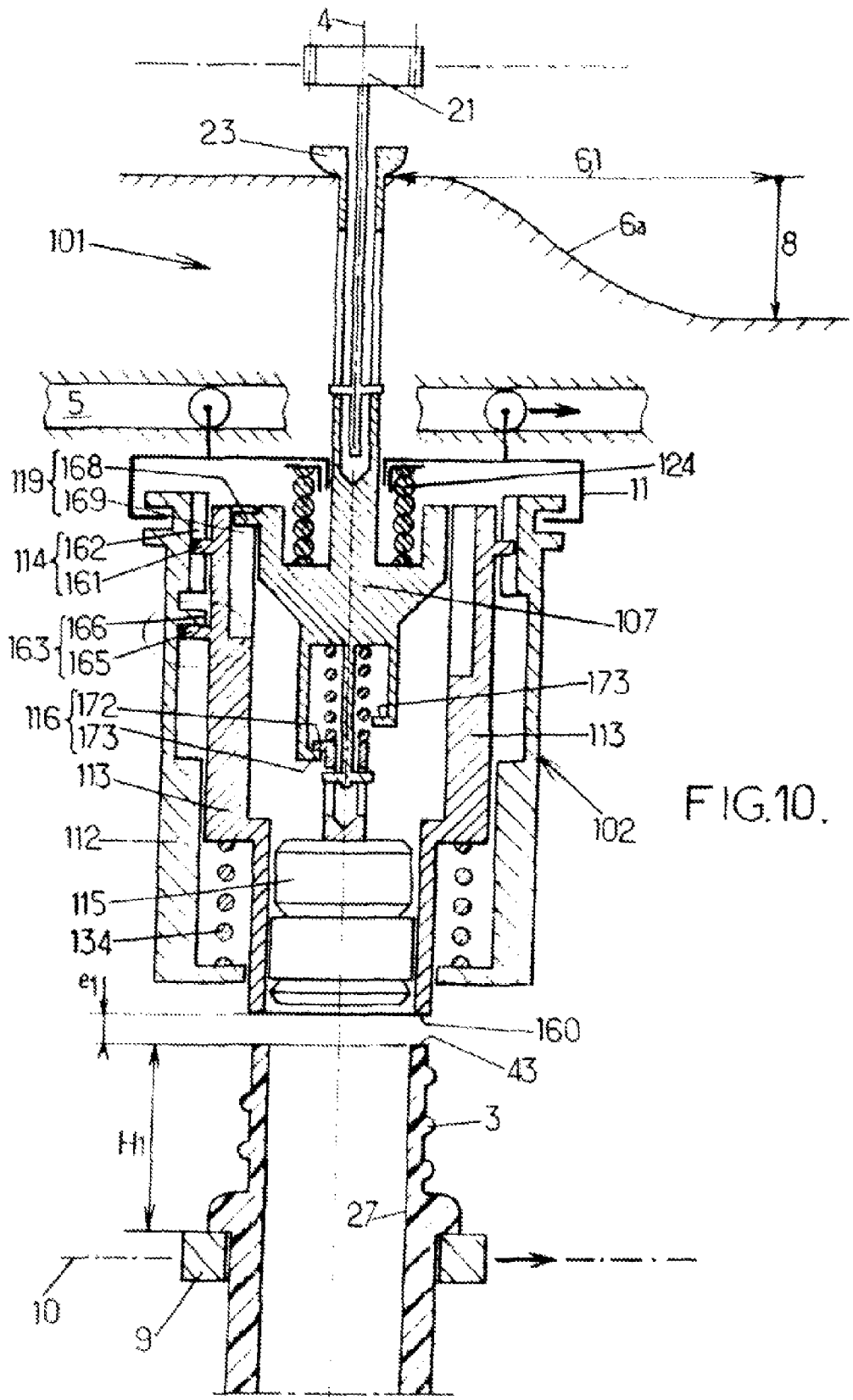
FIG. 10 is a longitudinal cross-section of a second embodiment in the retracted position, for a short neck.

As illustrated in FIG. 10, the selective external angular indexing means 114 consists of two catches 161 sliding in two longitudinal grooves 162 that are diametrically opposite. By pulling downwards on the stop body 113, the operator causes the catches 161 to exit the grooves 162, pivots the stop body 113 by 180 degrees relative to the guiding body 112, and reinserts the catches in the corresponding grooves 162.

In one of the relative angular positions illustrated in FIG. 10, the guiding body and stop body 112, 113 have a first axial retraction stop system 163. In the second selected angular position illustrated in FIG. 12, the stop body and guiding body 112, 113 have a second axial retraction stop system "164". The first and second axial retraction stop systems 163 consist of a catch 165 protruding from the stop body 113 which comes into contact either with a first retraction stop 166 in the axial indexing illustrated in FIG. 10, or with a second stop 167 of the guiding body 112 when the stop body 113 is in the angular indexing illustrated in FIG. 12.

Similarly, the selective angular means 119 comprises a catch 168 on the mandrel support 107, sliding in two grooves 169 arranged inside the stop body 113. The operator pulls the stop body 113 downward to pivot it by 180 degrees while the guiding body 112 and the mandrel support 107 remain unmoving. The changes in angular indexing of the means 114 and 119 are therefore simultaneous.

Figure 11:
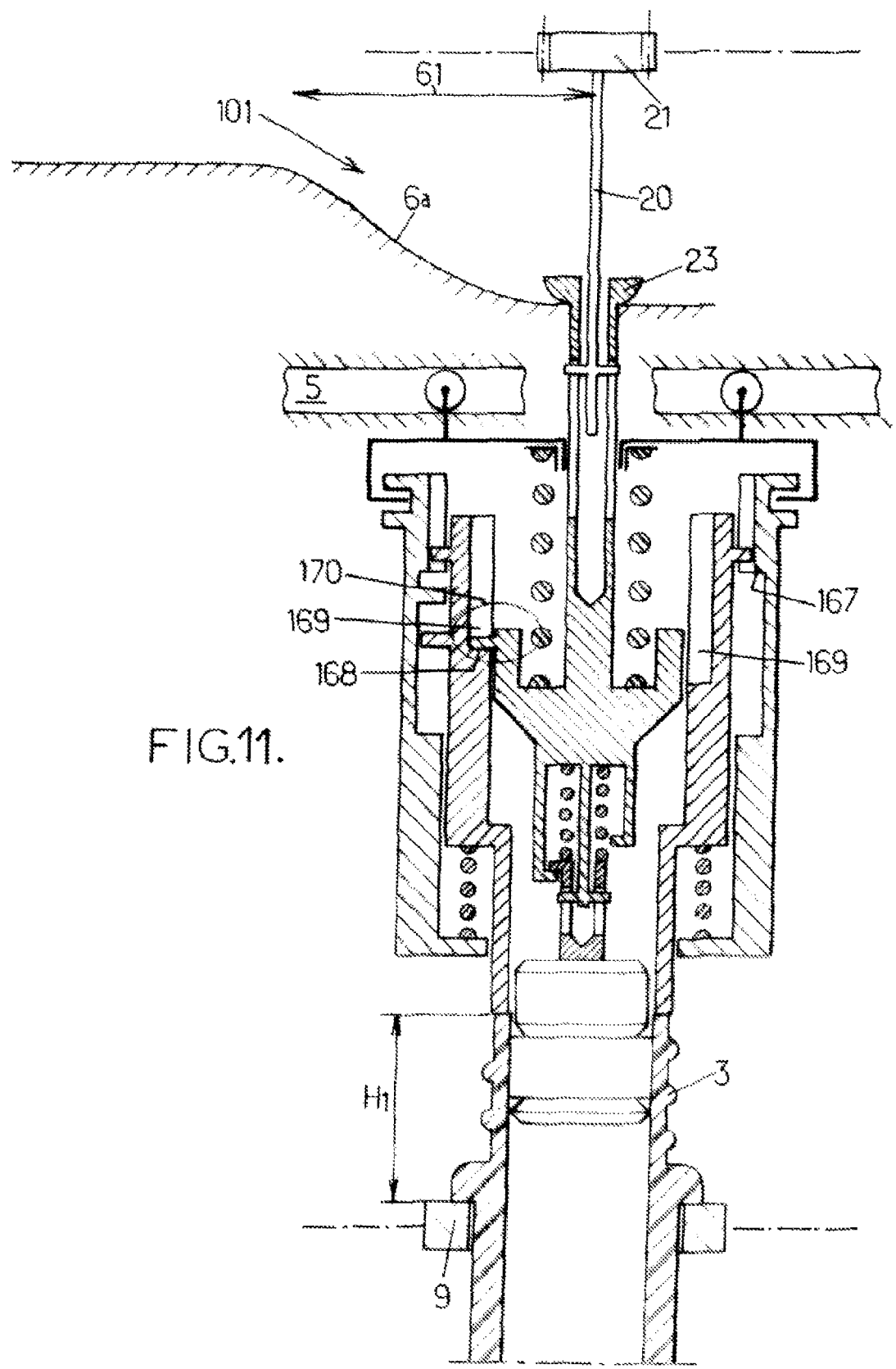
FIG. 11 is a longitudinal cross-section of the second embodiment in the insertion position, for a short neck.
Figure 12:
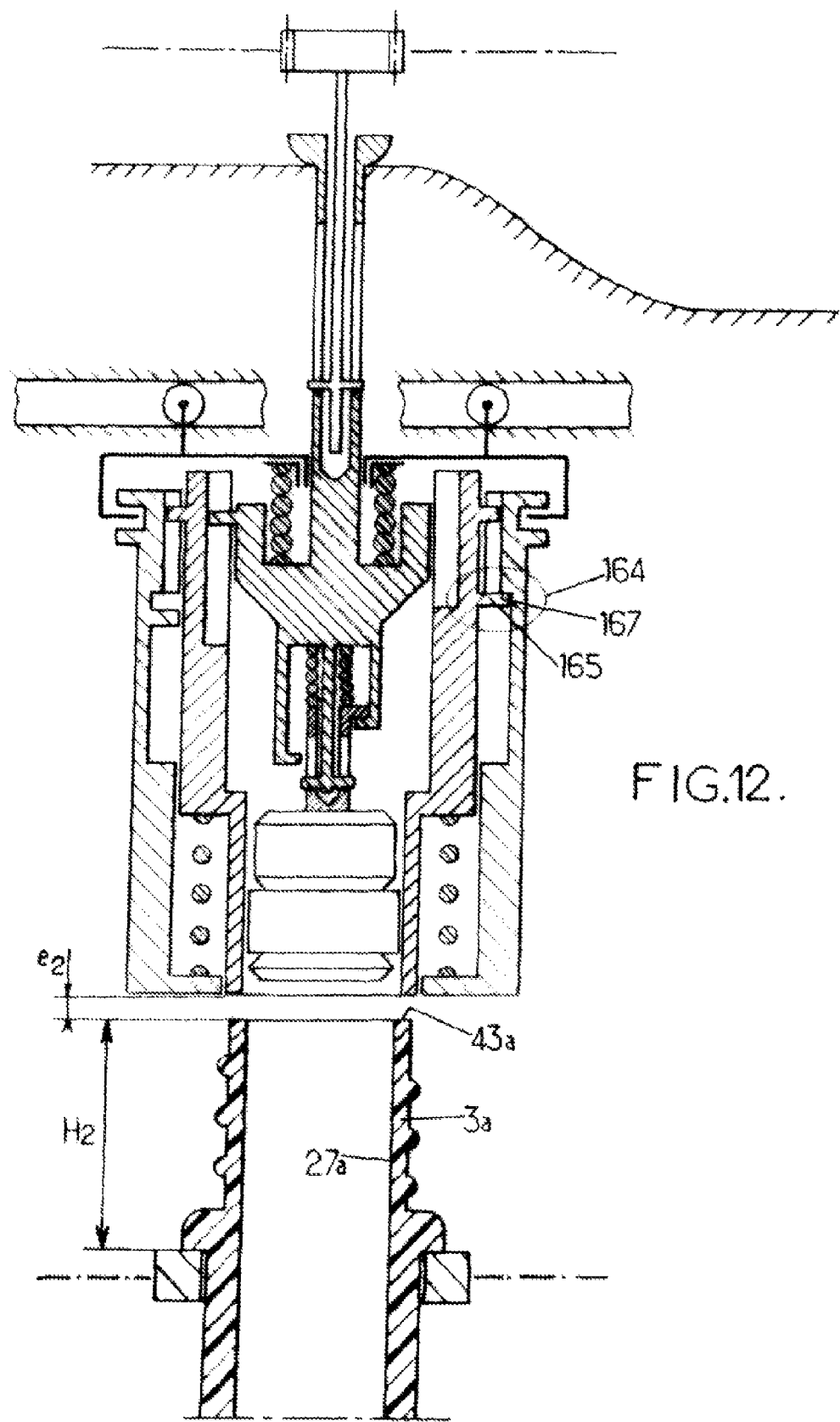
FIG. 12 is a longitudinal cross-section of the second embodiment in the retracted position, for a long neck.
Figure 13:
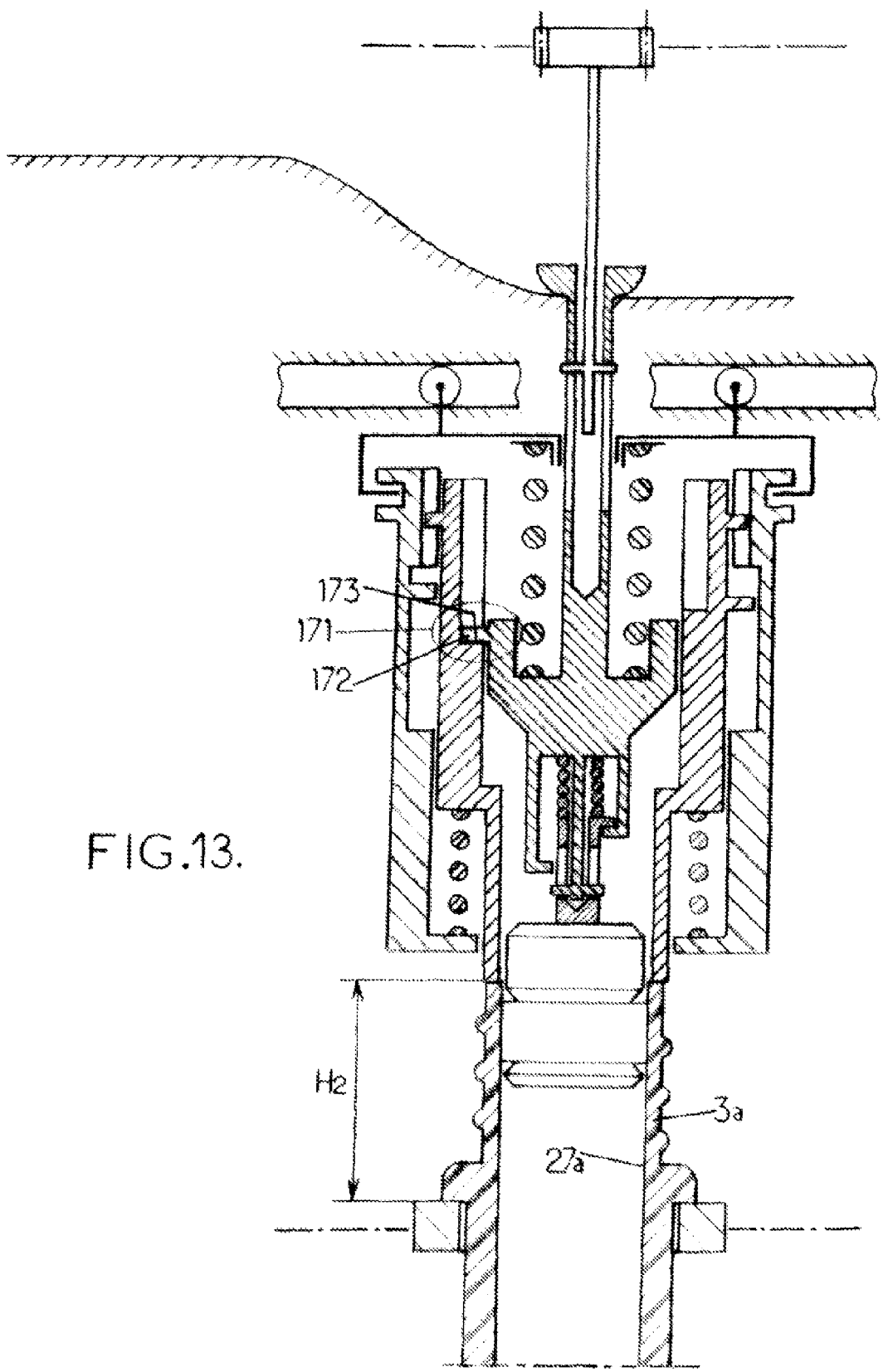
FIG. 13 is a longitudinal cross-section of a second embodiment in the insertion position, for a long neck.

The gripping device 102 has a first axial support stop system 170, illustrated in FIG. 11, which is active when the stop body 113 is in the angular position illustrated in FIGS. 10 and 11, and a second axial support stop system 171, illustrated in FIG. 13, when the stop body 113 is in the second angular indexing illustrated in FIGS. 12 and 13.

The first and second axial support stop systems 170, 171 are formed by the fact that the catch 168 on the mandrel support 107 carries the stop body 113 along with it once it comes into contact with the bottom of one of the grooves 169.

The selective axial indexing means 116 between the mandrel 115 and the mandrel support 107 also relies on a catch pressing against a different axial stop 173 depending on whether the mandrel 115 is pivoted by 180 degrees relative to the mandrel support 107 (FIGS. 10 and 11).

The axial distance between the first stop 166 and the second stop 167 of the guiding body 112 is equal to the difference "H2−H1" between the neck heights of the preforms 3 and 3a (FIGS. 10 and 12). Thus the extreme retracted position of the stop body 13 has its lower extreme surface 160 at the same distance above the mouth 43 or 43a of the preforms 3, 3a.

The axial distance between the bottoms of the two grooves 169 inside the stop body 112 is also equal to the difference "H2−H1", such that the lower surface 160 of the stop body 113 is perfectly in contact with the respective mouths 43 and 43a of the preforms 3, 3a (FIGS. 11 and 13).

Advantageously, the difference in axial distance between the stops 173 of the mandrel support 107 is also equal to the difference "H2−H1" such that the gripping mandrel 115 penetrates into the mouth 43 or 43a by the same respective distance (FIGS. 11 and 13).

In one variant, the conveyance systems 1 or 101 may be equipped with fixed cam systems having two parallel surfaces ensuring the insertion and retraction of the mandrel supports 7, 107 with no need for supporting springs 24, 124. The angular indexing means, which do not constrain the relative axial movement, may consist of ribs or of combined translational guide surfaces having one or more angular periodicities around the axis 4 of the device. For example, the bores 30 and the guide diameter 31 may have a square, rectangular, or elliptical cross-section.

In another variant, the gripping device 102 may have only the selective angular indexing means 119 which allows the lower surface 160 of the stop body 113 to act as a seat for the two types of preforms 3, 3a. In this case, the height e1, e2 required for the stripping is different for the two types of preforms 3, 3a, and the penetration of the mandrel into the neck is also different.

In another variant, the gripping device 102 may have a second selective angular indexing system, either between the mandrel 115 and the mandrel support 107, or between the stop body and guiding body 112, 113.

Similarly, the gripping device 2 may not have a selective axial indexing means 16 for the gripping mandrel 15.

In another variant, the gripping device 2 may be equipped with a return means between the guiding body and stop body 12, 13, using an elastic coil spring.

In another variant, the gripping device has a selective axial indexing means based on repelling magnets, not between the mandrel 15 and the mandrel support 7, but between the mandrel support 7 and the stop body 13. This eliminates the need for the adapter washer 39.

The invention claimed is:

1. Device for gripping an object in the form of a blow-moulding container preform, comprising:
a guiding body;
a stop body, mounted so as to move axially relative to the guiding body along an axis of the device;
a mandrel support, equipped with a gripping mandrel, able to move axially relative to the guiding body and having an insertion stroke going from a retracted position to an insertion position in which the gripping mandrel is capable of gripping the object;
an insertion direction defined as being parallel to the axis of the device and oriented from the retracted position towards the insertion position,
a retraction direction defined as being parallel to the axis of the device and opposite the insertion direction, and
a return means mounted between the guiding body and the stop body, for the purpose of driving the stop body in the retraction direction,
wherein the stop body has, together with the mandrel support, a system of support stops arranged so that the mandrel support drives the stop body axially over an end portion of the insertion stroke.

2. Device according to claim 1, wherein the stop body and the guiding body comprise a system of guiding stops that limit the axial movement of the stop body towards the retraction direction.

3. Device according to claim 1, wherein the stop body and the guiding body are made of non-magnetic material, and wherein the return means comprises at least one permanent magnet mounted onto one of either the guiding body or stop body and an element of magnetic material mounted on the other of the guiding body or stop body.

4. Device according to claim 1, wherein the return means comprises at least one pair of return magnets consisting of a first permanent magnet mounted on the guiding body and a second permanent magnet mounted on the stop body, the magnetic axes of the first and second permanent magnets being perpendicular to the axis of the device and being situated in a same radial half-plane, the magnetic axis of the first permanent magnet being offset along the axis of the device relative to the magnetic axis of the second permanent magnet, in the insertion direction if the two permanent magnets are mutually attracting and in the retraction direction if the two permanent magnets are mutually repelling.

5. Device according to claim 4, comprising a plurality of pairs of return magnets,
wherein the half-planes corresponding to each pair of return magnets are uniformly distributed around the axis of the device, and the axial offset distances for each pair is identical.

6. Device according to claim 5, wherein the first return magnets of each pair is identical and the second return magnets of each pair is identical.

7. Device according to claim 5, wherein the stop body has a radially extending seating surface located at the insertion end of the stop body, said device additionally comprising a removable adapter washer intended to be attached to said seating surface.

8. Device according to claim 7, comprising a plurality of attachment magnets for attaching the adapter washer to the stop body, the attachment magnets of the stop body being arranged around the axis of the device so as to come in between the second permanent return magnets.

9. Device according to claim 1, comprising a selective means of axial indexing between the mandrel support and the gripping mandrel, defining several extreme positions of the gripping mandrel for the same insertion position of the mandrel support.

10. Device according to claim 9, wherein the selective axial indexing means comprises a groove having two parallel walls which a pin slides between, at least a portion of the groove being helicoid; the groove being arranged in the mandrel support and the pin being attached to the mandrel, or the groove being arranged to the mandrel, and the pin being attached to the mandrel support.

11. Device according to claim 10, wherein the groove is closed at its two ends, said device additionally comprising at least one pair of indexing magnets mounted so they are repelling, one on the mandrel support and the other on the gripping mandrel, such that the pin is pressed against one of the two ends of the groove.

12. Device according to claim 11, wherein the stop body comprises an external angular indexing means with the guiding body and an internal angular indexing means with the mandrel support, the guiding body being assembled to rotate freely in a main body of the device.

13. Device according to claim 12, wherein the return means comprises at least one pair of return magnets consisting of a first permanent magnet mounted on the guiding body and a second permanent magnet mounted on the stop body.

14. Device according to claim 13, wherein the indexing magnet, or magnets, mounted on the mandrel support are each facing one of the first permanent return magnets when the mandrel support is in the insertion position and have the same magnetic orientation as said first permanent return magnet.

15. Device according to claim 10, wherein the stop body comprises an external angular indexing means with the guiding body and an internal angular indexing means with the mandrel support, the guiding body being assembled to rotate freely in a main body of the device.

16. Device according to claim 1, comprising a selective angular indexing means between the stop body and the mandrel support, having a plurality of angular positions in each of which the axial movement is limited by a system of support stops which allow driving the stop body axially over a different portion of the insertion stroke of the mandrel support, different for each of the angular positions.

17. Device according to claim 1, comprising a selective angular indexing means between the guiding body and the stop body, having a plurality of angular positions in each of which the axial movement of the stop body relative to the guiding body is limited by a system of axial guiding stops defining a retracted position of the stop body that is different for each of said angular positions.

18. Device according to claim 1, wherein the stop body has a radially extending seating surface located at the insertion end of the stop body, said device additionally comprising a removable adapter washer intended to be attached to said seating surface.

19. Device according to claim 1, comprising a selective means of axial indexing between the mandrel support and the gripping mandrel, defining several extreme positions of the gripping mandrel for the same insertion position of the mandrel support.

20. System for conveying objects, comprising a conveyor that conveys a plurality of gripping devices according to claim 1, said system having a loading area and a means of bringing objects to be loaded on a loading seat, the axis of a gripping device being perpendicular to the path said device follows as it passes through the loading area, said device cooperating with a fixed position cam system to drive the mandrel support axially.

* * * * *